(No Model.)

N. ROSSI.
LEMONADE SHAKER.

No. 590,336. Patented Sept. 21, 1897.

Witnesses.

Inventor.
Nicholas Rossi,
By C. B. Bachelle
his attorney

UNITED STATES PATENT OFFICE.

NICHOLAS ROSSI, OF EMPORIA, KANSAS.

LEMONADE-SHAKER.

SPECIFICATION forming part of Letters Patent No. 590,336, dated September 21, 1897.

Application filed June 5, 1897. Serial No. 639,632. (No model.)

*To all whom it may concern:*

Be it known that I, NICHOLAS ROSSI, a citizen of the United States, residing at Emporia, in the county of Lyon and State of Kansas, have invented certain new and useful Improvements in Lemonade-Shakers; and I do hereby declare the following to be a full, clear, and exact description of the invention, such as will enable others skilled in the art to which it appertains to make and use the same.

My invention relates to improvements in lemonade-shakers or drink-mixers; and the object is to provide a device, article, or implement for the purpose of shaking and mixing lemonade and other drinks which is simple and durable in construction and efficient in operation.

I have fully and clearly illustrated the invention in the accompanying drawings, wherein—

Figure 1:
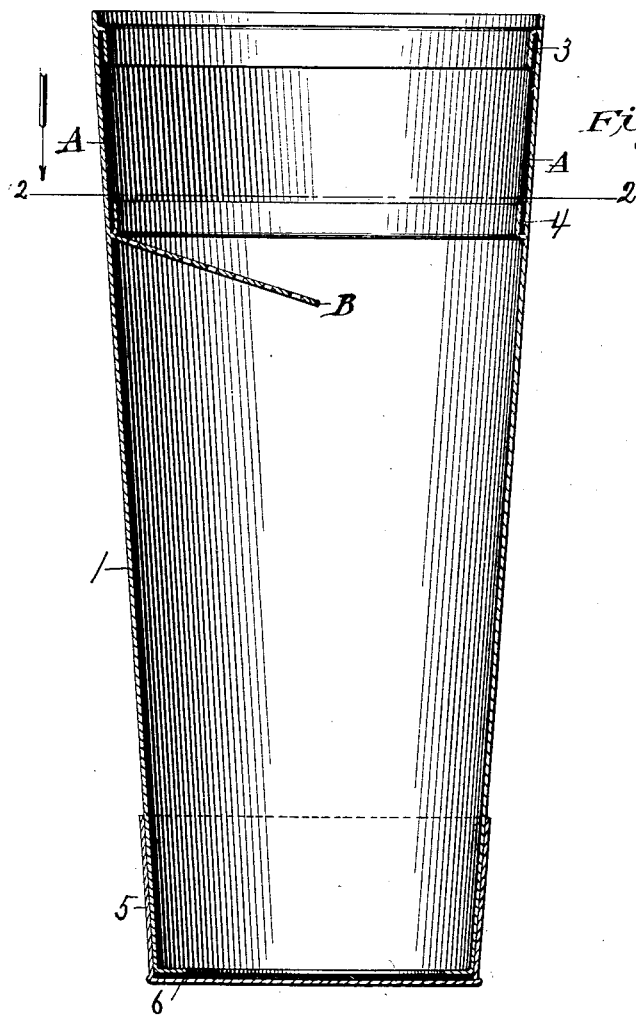
Figure 2:
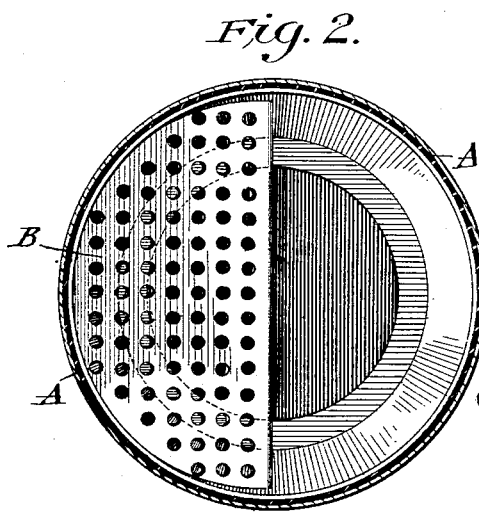

Figure 1 is a central vertical section through the implement. Fig. 2 is a transverse section on the line 2 2 of Fig. 1.

1 designates the shell or body of the vessel, made of any suitable metal or other material adapted for the purpose and preferably tapering from top to bottom. Adjacent to the top of the vessel is formed an interior depending annular flange 3, and at a proper distance below the flange 3 is formed an interior vertically-directed annular flange 4, the two flanges serving as keepers for holding the edges of an india-rubber or elastic lining A, fitted within the vessel with its edges inserted and held under the said flanges, the lining serving as a close and easy seat for the open end of a tumbler when inserted in the implement for the purpose of agitation in the usual and well-known manner. This elastic lining also prevents the tumbler from sticking in the shell, and at the same time affords a better seating-surface to prevent escape of the contents when the process of shaking is being done and renders breaks less liable.

B designates a strainer secured to the interior of the vessel at a distance from the mouth sufficient to not interfere with the inserted tumbler and extending about half across the vessel and arranged at a downward incline, substantially as shown, and formed with a plurality of openings through which the contents are strained and discharged.

On the bottom of the vessel is fitted a cup 5, and between the bottom of the vessel and the bottom of the cup is disposed and fitted a rubber plate 6, which serves to preserve the parts against the usual dents and displacement.

What I claim is—

A lemonade-shaker, comprising a suitable vessel formed with an annular interior depending flange adjacent to its upper or open end and a lower interior annular flange vertically extended, and an elastic lining in the vessel between the flanges and held thereby.

In testimony whereof I affix my signature in presence of two witnesses.

NICHOLAS ROSSI.

Witnesses:
  THOMAS BISHOP,
  C. F. IRELAND.